Figure 1:
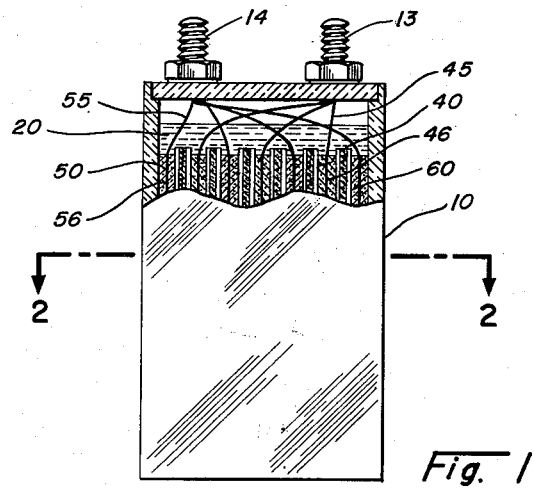
Figure 2:
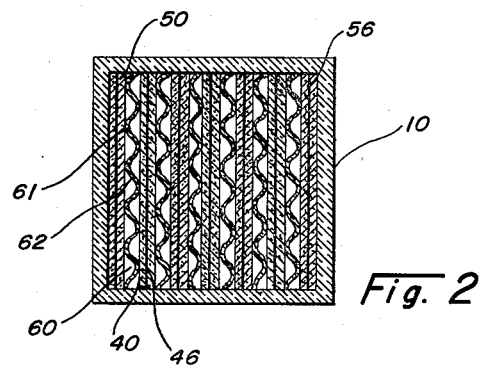

July 23, 1963   C. HOROWITZ ET AL   3,098,770
ANHYDROUS ELECTRIC BATTERY
Filed Feb. 3, 1958

INVENTORS:
CARL HOROWITZ
THOMAS BREITNER
BY
AGENT.

United States Patent Office 3,098,770
Patented July 23, 1963

3,098,770
ANHYDROUS ELECTRIC BATTERY
Carl Horowitz, Brooklyn, and Thomas Breitner, New York, N.Y., assignors to Yardney International Corp., New York, N.Y., a corporation of New York
Filed Feb. 3, 1958, Ser. No. 713,034
10 Claims. (Cl. 136—100)

This invention relates to electrochemical batteries and more particularly to an electrochemical system based on an anhydrous electrolyte.

It has been known in the past to use methanol with salts dissolved therein. Such solutions have been used primarily to depress the freezing points of aqueous systems in much the same way that anti-freeze solutions are used in automobile radiators. Such "antifreeze" electrolyte systems are inherently limited in their voltages and permissible current drains even at room temperature. At the lower temperatures of their permissible ranges, i.e. at −10° to −30° C., the conventional couples yield voltages of approximately 0.7 to 1.5 volts at currents of less than ma. per dm.$^2$. Electrolyte systems based on polyhydroxy-alcohols have also been used. Such systems using glycols and glycerol are capable of only the most limited current drains even at room temperature. Their most important use is in the field of bias-cells, i.e. as sources of potential subject to practically no current drain.

It is an object of this invention to provide an improved electrolytic cell with an anhydrous electrolyte.

Another object is to provide a current-producing cell containing electrodes of couples having higher electrochemical potentials than are possible in aqueous electrolytes.

It is a further object of this invention to provide an electrolytic cell capable of operating at normal current drains in an extended temperature, e.g. of +80° C. to −80° C.

It is also an object of this invention to provide cell components and structures designed for such low-temperature operation.

And it is a further object to provide a convenient method of making electrodes for use in anhydrous electrolytes capable of low-temperature operation.

The electrochemical system of this invention includes a substantially anhydrous electrolyte, consisting of a highly conducting organic liquid in the form of a non-aqueous solvent in which an inorganic compound constituting a Lewis acid in relation to this solvent, has been dissolved, and a set of compatible positive and negative electrodes constituting an effective electrochemical couple. With this system, of course, are associated the usual accessories forming part of a complete battery including conductors, current-collecting grids, separator systems and electrode-irrigation devices where needed.

The anhydrus electrolytes found to be operative in a cell embodying this invention are based on solutions containing organic non-ionic liquids as solvent having dielectric constant greater than 12. Some of the more suitable compounds in this class are listed in Table 1. Those most suitable from an overall point of view are based on nitriles and ketones. In this class the preferred solvents are acetonitrile, propionitrile and mixtures of these compounds. In the solvent are dissolved one or more inorganic and/or organic salts at least one of which has the inherent characteristic of being a Lewis acid in relation to the solvent and readily forms ionic complexes in and with the solvent. Such Lewis acids additionally have the inherent feature of lowering the electrical resistance of the solvent and lowering the freezing points of the resultant solutions below that of the pure solvent. A preferred material in this class is $AlCl_3$. Among other such salts there may be mentioned $ZrCl_4$, $BFl_3$ and $AlBr_3$.

TABLE 1

Special additives in the form of organic and inorganic materials may be added to the above solutions and each in its own fashion may favorably modify the solution as by reducing the low-temperature viscosity, enhancing the detergency of the electrolyte, improving conductivity characteristics and inhibiting the formation of polarizing compounds at the electrodes.

Table 2 is a listing of representative "Lewis" acids found to possess favorable characteristics in the solvents listed on Table 1. It will be apparent that certain of the Lewis acids will not be suitable in all of the solvents. Some will not dissolve in certain solvents, others will react with some of the chemically active solvents, but as a general group all of the Lewis acids listed, which may all be generally classed as "strong Lewis acids" with reference to the solvent, will be effective to the degree that they are compatible with the solvent.

TABLE 2

The unique feature of the electrolyte with which the battery of this invention operates is that it consists of a solution of a Lewis acid in a substantially anhydrous electrolyte in such concentration that the resultant solution has a specific resistivity of less than 500 ohm-centimeters at room temperature.

By the term "substantially anhydrous" is meant that the solution contains less than 0.5% water and furthermore that the presence of water is not required for its operation. Table 3 is a list of electrolytes according to this invention and the conductivity of such electrolytes.

TABLE 3

The Lewis acids referred to are those compounds, inorganic and organic, which are capable of acting in the selected solvent as electron acceptors. According to the Lewis or electronic concept of acids and bases many substances which contain no active (ionizable) hydrogen can act as acids and do enter into neutralization reactions. The basic concept is set forth in the chemical literature, i.e. Lewis G.N., JACS 46, 2027 (1924) etc.

These acids form soluble ionic complexes wtih certain solvents possessing high dielectric constants. Solvents not possessing this quality tend to form "covalent" complexes, which do not ionize substantially and are not capable of carrying appreciable currents. The lower molecular weight solvents are preferred. The reason for the low-molecular weight preference with regard to the solvent is best understood from consideration of ion mobility and diffusion phenomena but the preference need not be restrictive.

An example of such an electrolyte is the ionizable complex formed by acetonitrile ($CH_3CN$) containing 20% dissolved aluminum chloride (anhydrous). This combination has been demonstrated chemically to form ionic complexes with the solvent, which then dissolve in an excess of the nitrile.

From the tables it is seen that other combinations of solvent and solute will also be serviceable. Choice of a particular combination is predicated to a large degree upon the particular function for which the complete cell is designed. This involves not only the choice of electrolyte but choice of electrodes, separators, etc., all determined by the ultimate performance requirements such as capacity, discharge rate, shelf life, temperature range of operation, and so forth.

The Electrodes

The electrodes operative with the anhydrous cells of this invention include the metallic couples as well as those based on depolarization by oxidation and reduction. The latter systems are preferred inasmuch as the depolarizing action of the oxidized compounds permits higher current drains.

The electrolyte is non-aqueous which makes it possible to achieve higher potential differences between the electrodes than is possible where water is present. This is due to the fact that when the E.M.F. is high enough (i.e. 2.1 volts) an aqueous electrolyte will undergo electrolysis of the contained water. Such destructive electrolysis cannot take place at voltages afforded by electrochemical couples in the anhydrous electrolytes of this invention.

Table 4 is a compilation of the various electrode systems which function satisfactorily at medium discharge rates for short periods of time.

TABLE 4

For purposes of disclosure the invention will be specifically described with respect to a calcium/silver-chloride electrode system. It should be noted with respect to this system however that not only calcium but also strontium, barium, lithium, and magnesium may be used as the negative electrode for high-potential couples. Since an anhydrous electrolyte system is used it is even possible to use sodium, potassium, cesium and rubidium—all highly active as the negative electrodes if passivation treatments are applied to these metals to prevent excess reaction with the electrolyte on standing.

While the system is being specifically described with respect to positives of silver chloride, we have found that the silver oxides, lead dioxide, the higher lead chlorides, the mercury oxides and halides (of which calomel or mercurous chloride is particularly effective) cerium oxide and halides as well as the higher-valence chromium compounds all yield useful voltages. All the above positive electrode systems, when combined with calcium negatives, yield potentials in excess of 2 volts. Such potentials as will be readily understood, cannot be produced in any electrolyte system containing water in any but trace quantities. Other electrode systems may be mentioned at this time which yield lower voltages (where the positive component is nickel oxide, iron oxide, or one of the oxides of copper or cobalt). Since the voltages of these systems are rather low, there is very little practical advantage in using such systems under normal conditions, but they do find special uses for extreme-low-temperature operation, e.g. a range of −65° to −100° C., where the electrolyte system of this invention is capable of permitting electrolytic current generation.

The Negative Electrode

The negative electrode exemplified for use in a cell according to this invention is one fabricated from commercially available flake calcium, compressed around a current-collecting supporting framework. In general the flake calcium is compressed around both sides of a support of silver, magnesium copper, or iron, in the form of so-called "expanded" metal. A die cavity is layered with flake calcium, the sheet of expanded metal is placed on top of this and then the balance of the calcium is layered over the expanded metal. The contents of the mold cavity is then compressed by means of a hydraulic or other press at a pressure ranging from 500–10,000 kg./cm.$^2$. By keeping more or less within this pressure range it is possible to prepare electrodes having sufficient strength for normal careful handling and assembly as well as sufficient surface area to provide adequate discharge rates even at low temperatures.

Sodium, strontium and other soft-metal electrodes may be made by variations of the above method based upon appropriate pressures adjusted to the yield point of the particular metal.

The Positive Electrode

A positive electrode adopted to be used by way of example in a cell embodying this invention is a novel silver-chloride electrode made from a silver-power/silver-chloride mixture and a supporting current-collecting network preferably in the form of a perforated, expanded silver sheet. A mixture of 20% silver powder and 80% silver chloride (both 80 to 150 mesh) is lightly pressed around both sides of a silver expanded-metal support in a manner similar to that disclosed above in connection with the negative electrode. The amount of pressure involved is only sufficient to assure adequate compaction of the material to the support so that it be self-supporting and capable of handling in the next operation, which is heat treatment. The heat treatment best takes place in the temperature range of 200° to 425° C., i.e. below the melting point of silver chloride (455° C.). The baking takes from about 15 minutes to less than one minute at the higher temperatures. In general, electrodes more than adequate for the purposes of this invention have been prepared by baking compacted silver-chloride mixes of the nature set forth at a temperature of 350° C. for 5 minutes. Such electrodes have much higher surface areas than electrodes prepared by the conventional fusion and rolling of silver chloride.

The active mixture is preferably made up of silver chloride and silver powder in a ratio of 0–40% silver powder, since there is no tendency for the formation of a self-discharging couple between the silver chloride and the silver. Other conductors including graphite and metals other than silver, may be used so long as they, too, are not capable of initiating self-discharge of the silver chloride. The amount of silver powder is dependent on the rate of discharge it is desired to achieve with the particular cell. While silver chloride is slightly conductive, its conductivity is too low to permit its use without conductive additives when the cell is to be used for low temperatures, or under high-rate conditions. It is for these reasons that the silver is advantageously incorporated into the mix, but a concomitant benefit that is derived from this addition is the ease of heat treatment or sintering of the silver chloride as a result of the rapid heat transmission through the mass of the electrode being treated.

The other suitable positive active materials may be processed, where feasible, in the manner described above; where heat treatment is not feasible, they may be compacted along with added conductive powders around current-collecting members. Where the particular active material is sufficiently electroconductive, the conductive additives may be omitted.

Cell Accessories

Separators: The prime requirement for separators in cells of this type, aside from inter-electrode insulation, is that they permit adequate access of the electrolyte to the electrode faces and enable circulation of the electrolyte through their body. The types of material that are suitable are restricted by the active solvent characteristics of the electrolyte, it being understood that the separator should not dissolve in the electrolyte. Wood fiber impregnated with phenol-formaldehyde resins has proved adequate for this purpose, as have cross-linked perforated polyethylene, cellulosic felts such as filter papers, fiberglass mats, porous fluorinated hydrocarbon polymers, perforated polyethylene, porous polyvinylidene chloride (Saran), and various perforated cross-linked plastic materials of the thermosetting type.

Cases: Any material resistant to the action of the electrolyte and the electrodes can be used. Metal cases may be used if properly coated and isolated from the electrodes. Among the materials found satisfactory for the fabrication of cases for room-temperature and low-temperature operation for the cells of this invention are glass, Saran, phenol-formaldehyde resins, alkyd, polyethylene, fluorinated hydrocarbon resins as well as ceramic materials. Casings of an envelope type have also been prepared from heat-sealed polyethylene.

A feature requiring consideration when designing cells according to this invention is a provision for adequate circulation of electrolyte at the face of the electrodes. Corrugation and perforation of the separator and/or mechanical agitation of the electrolyte are effective to insure satisfactory electrolyte circuation.

Electrolyte additives: By judicious blending of solvents for the Lewis acids it is possible to achieve electrolytes liquid as low as −100° C. Table 1 lists the freezing points of acetonitrile, propionitrile, isobutyronitrile and n-butyronitrile etc. Mixtures of course may have lower freezing points. The addition of the Lewis acid also will depress the freezing point of the final electrolyte but the effect of the Lewis acid in general is not too significant in this respect since the addition of 20% of $AlCl_3$ depresses the freezing point of acetonitrile only by 8° C.

Various "per-acids" and their salts (such as $K_2S_2O_8$) may be added in small quantities to the electrolyte to improve the rate of the reactions which take place at the surfaces of the electrodes and which seem to be among the determining factors that govern discharge rates.

Under certain circumstances it has been found that in order to achieve the highest capacity in a given cell system, the ratio of the weight of the total positive active material to the electrolyte should be approximately 2 to 1. By the addition of materials which may be classified as proton donors it is, however, possible to realize high capacities with a lower proportion of electrolyte. Such materials include non-ionized organic compounds having an easily oxidizable hydrogen; among them are alcohols and ethers. The addition of 0.1% to 1% of an alcohol and/or ether to the electrolyte has markedly raised the capacity of the cell systems.

Additives capable of enhancing the storage capacity of a cell according to the invention, containing an anhydrous electrolyte such as a 20% solution of $AlCl_3$ in acetronitrile and/or propionitrile, include the following: diethyl-ether, $(C_2H_5)_2O$, ethylene oxide, $CH_2CH_2O$, propylene oxide, $CH_3CHCH_2O$, trimethylene oxide, $$CH_2CH_2CH_2O$$

Cell Assembly

The sole FIGURE of the accompanying drawing shows an assembly diagram of a cell constituting a representative embodiment of this invention. Two negative plates 40 and three positive plates 50 with intervening separators 60 are encased in solvent resistant polyethylene battery casing 10. Each of the electrode plates has a current-conducting lead 45 or 55 extending from a respective grid 46 or 56, which is brought out of the casing via terminals 13 and 14. It is understood, of course, that the electrolyte 20 is in the casing.

Each separator layer is corrugated and contains along each side a small area 61 in contact with the electrode and a larger area 62 enclosing a quantity of free electrolyte. The amount of free electrolyte circulating over the face of each electrode is not critical but should be considerable since the degree of ion mobility and/or the rate of reaction-product diffusion can become discharge-rate-controlling factors.

EXAMPLE 1

In the manner described above a set of strontium negative and lead-peroxide positive electrodes was prepared. The support for each strontium plate was an expanded magnesium sheet while expanded silver sheets were used as the current-collecting elements for the lead-oxide plates. The electrodes were inserted into rigid polyethylene cases and an anhydrous electrolyte, consisting of 20% $AlCl_3$ dissolved in a mixture of equal parts of propionitrile and n-butyronitrile was added. The open-circuit voltage of this couple at room temperature was 3.6 volts. At −90° C. the open-circuit voltage was 2.55 volts.

From the foregoing specific illustrations it may be seen that a group of particular interest among the salts forming Lewis acids, for purposes of this invention, are compounds (notably halides) of amphoteric metals.

TABLE I

| Compound | Formula | Molt. weight | M.P. | Dielectric constant | Conductivity |
|---|---|---|---|---|---|
| Acetonitrile | $CH_3CN$ | 31 | −44 | 37.5 | $5.9 \times 10^{-8}$ mhos |
| Propionitrile | $CH_3CH_2CN$ | 55 | −98 | 27.2 | $8.5 \times 10^{-8}$ |
| iso-Butyronitrile | $\frac{CH_3}{CH_2}CH.CN$ | 69 | −52 | 25.4 | |
| n-Butyronitrile | $CH_3CH_2CH_2CN$ | −69 | −112 | 20.3 | |
| Acetone | $(CH_3)_2CHO$ | −58 | −95 | 20.7 | $5.8 \times 10^{-8}$ |
| Methyl-ethyl ketone | $\frac{CH_3}{C_2H_3}CHO$ | 72 | −86 | 18.5 | $10 \times 10^{-8}$ |
| di-Ethyl ketone | $(C_2H_5)_2CHO$ | 86 | −42 | 17.0 | |
| Cyclopentonone | $CH_2(CH_2)_3CO$ | 84 | −58 | | |
| Cyclohexanone | $C_6H_{10}O$ | 98 | −45 | 18.2 | |

TABLE II

| $BCl_3$ | $Al_2(SO_4)_3$ | $SnCl_4$ | $ZnCl_2$ |
| $BBr_3$ | $AlBr_3$ | $BF_3$ | $MoCl_5$ |
| $AlCl_3$ | $ZnCl_4$ | $FeCl_3$ | $ZnCl_2$ |

TABLE III

| Solvent | Solute | Concentration of solute, percent | M.P., °C. | Resistivity in ohm-cm. |
|---|---|---|---|---|
| Acetonitrile | $AlCl_3$ | 20 | −51 | 24.0 |
| Do | $AlCl_3$ | 42 | −49 | 32.5 |
| Propionitrile | $AlCl_3$ | 20 | −76 | 47.0 |
| iso-Butyronitrile | $AlCl_3$ | 20 | −56 | 62 |
| Propionitrile-acetonitrile 1:1 | $AlCl_3$ | 20 | −76 | 34.2 |
| Acetonitrile | $AlCl_3$ | 5 | −46 | 28.0 |
| Acetone | $AlCl_3$ | 20 | −95 | 39.6 |
| Acetonitrile | $FeCl_3$ | Sat. | −50 | 28.0 |
| Do | $AlBr_3$ | 20 | −53 | 44.5 |
| Do | $ZnCl_2$ | Sat. | −48 | 350 |
| Do | $BF_3$ (in ether solution). | 20 | −63 | 333 |
| Do | $MoCl_5$ | 15 | −49 | 273 |
| Do | $ZrCl_4$ | 25 | −50 | 160.0 |

TABLE IV

| Couple | Solvent | Solute | Solute concentration, percent | O.C. voltage |
|---|---|---|---|---|
| Ca/Ag₂O | Acetonitrile | AlCl₃ | 20 | 3.13 |
| Ca/AgCl | do | AlCl₃ | 20 | 2.40 |
| Li/Ag₂O₂ | do | AlCl₃ | 20 | 3.40 |
| Al/Ag₂O₂ | do | AlCl₃ | 20 | .90 |
| Mg/Ag₂O₂ | do | AlCl₃ | 20 | 1.90 |
| Zn/Ag₂O₂ | do | AlCl₃ | 20 | 1.25 |
| Cu/Ag₂O₂ | do | AlCl₃ | 20 | .72 |
| Al/Ag₂O₂ | do | ZnCl₂ | 20 | .60 |
| Zn/Ag₂O₂ | do | ZnCl₂ | 20 | 1.00 |
| Cu/Ag₂O₂ | do | ZnCl₂ | 20 | .70 |
| Ca/Mg | do | AlCl₃ | 20 | .70 |
| Ca/Al | do | AlCl₃ | 20 | 1.10 |
| Ca/Fe | do | AlCl₃ | 20 | 2.10 |
| Ca/Zn | do | AlCl₃ | 20 | 1.50 |
| Ca/stainless | do | AlCl₃ | 20 | 2.10 |
| Ca/Pb | do | AlCl₃ | 20 | 1.90 |
| Ca/Cu | do | AlCl₃ | 20 | 1.99 |
| Ca/Ti | do | AlCl₃ | 20 | 2.30 |
| Li/Ag | do | AlCl₃ | 20 | 3.20 |
| Mg/Al | do | AlCl₃ | 20 | 1.20 |
| Ca/Ag | do | AlCl₃ | 20 | 1.20 |
| Mg/Ag | do | AlCl₃ | 20 | 1.75 |
| Al/Ag | do | AlCl₃ | 20 | 0.40 |
| Zn/Ag | do | AlCl₃ | 20 | 0.82 |
| Al/Zn | do | AlCl₃ | 20 | 0.50 |
| Cn/Ag | do | AlCl₃ | 20 | 0.37 |
| Ca/Si | do | AlCl₃ | 20 | 1.20 |
| Mg/Si | do | AlCl₃ | 20 | 0.90 |
| Ca/CaSi | do | AlCl₃ | 20 | 2.20 |
| Al/Ag | do | ZnCl₃ | 20 | 0.50 |
| Al/Zn | do | ZnCl₃ | 20 | .25 |
| Cn/Ag | do | ZnCl₃ | 20 | .45 |
| Zn/Ag | do | ZnCl₃ | 20 | .75 |
| Sr/AgCl | do | AlCl₃ | 20 | 2.70 |
| Ba/AgCl | do | AlCl₃ | 20 | 2.20 |
| Li/AgCl | do | AlCl₃ | 20 | 3.40 |
| Ca/PbO₂ | do | AlCl₃ | 20 | 3.65 |
| Ca/Fe₂O₃ | do | AlCl₃ | 20 | 2.42 |
| Ca/Hg₂Cl₂ | do | AlCl₃ | 20 | 2.55 |
| Ca/Hg₂O | do | AlCl₃ | 20 | 2.62 |
| Ca/AgCl | Methyl ethyl ketone | AlCl₃ | 20 | 2.5 |
| Ca/Ag₂O₂ | do | AlCl₃ | 20 | 3.15 |
| Ca/AgCl | Acetone | AlCl₃ | 20 | 2.45 |
| Ca/Ag₂O₂ | do | AlCl₃ | 20 | 3.10 |
| Ca/PbO₂ | Methyl ethyl ketone | AlCl₃ | 20 | 3.60 |
| Ca/AgBr | do | AlCl₃ | 20 | 2.47 |
| Ca/PbCl₂ | Acetonitrile | AlCl₃ | 20 | 2.35 |
| Ca/HgCl | do | AlCl₃ | 20 | 2.55 |
| Ca/HgO | do | AlCl₃ | 20 | 2.62 |
| Ca/Ag₂O | do | AlCl₃ | 20 | 1.05 |
| Ca/Ni₂O₃ | do | AlCl₃ | 20 | 2.95 |

We claim:

1. An electrochemical battery comprising a positive electrode, a negative electrode, and a substantially anhydrous electrolyte, said electrolyte comprising a low molecular weight organic solvent selected from the group consisting of ketones and nitriles having a dielectric constant greater than 12 and having dissolved therein an inorganic compound which constitutes a Lewis acid with respect to said solvent, said Lewis acid being selected from the group consisting of aluminum trichloride, aluminum tribromide, boron trichloride, boron tribromide, zirconium tetrachloride, aluminum sulfate, tin tetrachloride, ferric chloride, zinc dichloride, molybdenum pentachloride, and zinc trichloride said Lewis acid being capable of forming ionic complexes of good mobility with said solvent and being present in sufficient quantity to materially lower the electrical resistance and the freezing point of said solvent.

2. An electrochemical battery according to claim 1 wherein said electrolyte has a specific resistivity of less than 500 ohm-centimeters.

3. An electrochemical battery according to claim 2, wherein said solvent is selected from the group consisting of acetonitrile, propionitrile, isobutyronitrile, n-butyronitrile, acetone, methylethyl ketone, diethyl ketone, cyclopentanone, cyclohexanone, and said Lewis acid is selected from the group consisting of aluminum trichloride, aluminum tribromide, boron trichloride, boron tribromide, zirconium tetrachloride, aluminum sulfate, tin tetrachloride, ferric chloride, zinc dichloride, molybdenum pentachloride, and zinc trichloride.

4. An electrochemical battery according to claim 3 wherein said solvent is acetonitrile and said Lewis acid is aluminum trichloride.

5. An anhydrous electrolyte suitable for use in batteries over a wide range of temperatures comprising a low molecular weight organic solvent selected from the group consisting of ketones and nitriles having a dielectric constant greater than 12 and having dissolved therein an inorganic compound which constitutes a Lewis acid with respect to said solvent, said Lewis acid being selected from the group consisting of aluminum trichloride, aluminum tribromide, boron trichloride, boron tribromide, zirconium tetrachloride, aluminum sulfate, tin tetrachloride, ferric chloride, zinc dichloride, molybdenum pentachloride, and zinc trichloride said Lewis acid being capable of forming ionic complexes of good mobility with said solvent and being present in sufficient quantity to materially lower the electrical resistance and the freeing point of said solvent.

6. An electrolyte according to claim 5 wherein said electrolyte has a specic resistivity of less than 500 ohm-centimeters.

7. An electrolyte according to claim 6 wherein said Lewis acid constitutes at least 5% by weight of said electrolyte.

8. An electrolyte according to claim 6 wherein said solvent is selected from the group consisting of acetonitrile, propionitrile, isobutyronitrile, n-butyronitrile, acetone, methylethyl ketone, diethyl ketone, cyclopentanone, cyclohexanone, and said Lewis acid is selected from the group consisting of aluminum trichloride, aluminum tribromide, boron trichloride, boron tribromide, zirconium tetrachloride, aluminum sulfate, tin tetrachloride, ferric chloride, zinc dichloride, molybdenum pentachloride, and zinc trichloride.

9. An electrolyte according to claim 6 wherein said solvent is acetonitrile and said Lewis acid is aluminum trichloride.

10. An electrolyte according to claim 6 wherein said solution has a freezing point below substantially −40° C.

References Cited in the file of this patent

UNITED STATES PATENTS

| 1,108,638 | Stille | Aug. 25, 1914 |
| 2,441,896 | Moir | May 18, 1948 |
| 2,597,451 | Coleman et al. | May 20, 1952 |
| 2,597,456 | Coleman et al. | May 20, 1952 |
| 2,937,219 | Minnick et al. | May 17, 1960 |

OTHER REFERENCES

Walden, Electrochemic Nichlwassriger Losungen, 1924, pages 303–330.